Figure 1:
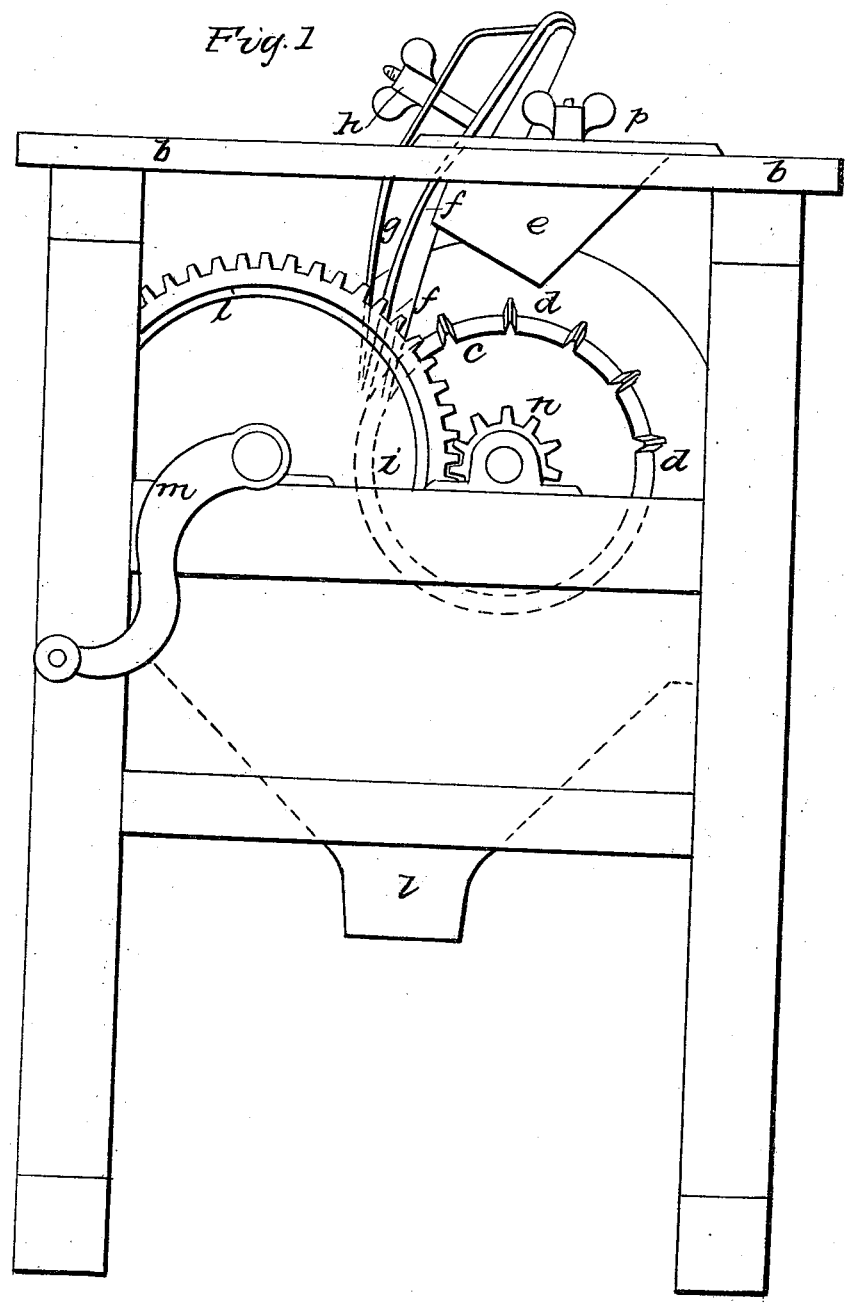

J. M. C. ARMSBY.
Corn Sheller.

No. 7,881.

2 Sheets—Sheet 1.

Patented Jan'y 7, 1851.

J. M. C. ARMSBY.
Corn Sheller.
No. 7,881.
2 Sheets—Sheet 2.
Patented Jan'y 7, 1851.
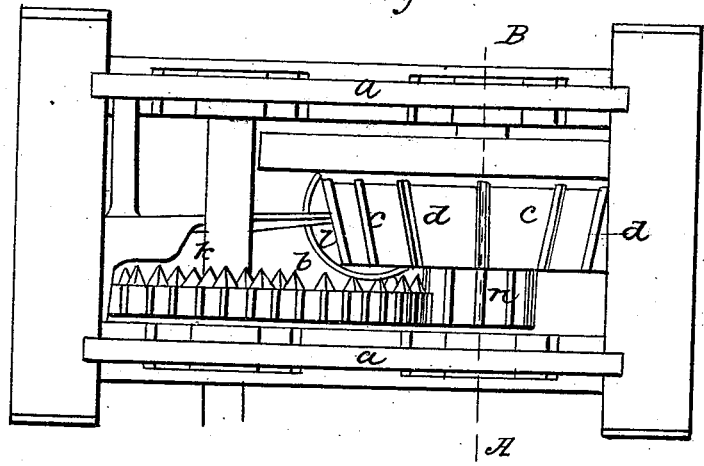
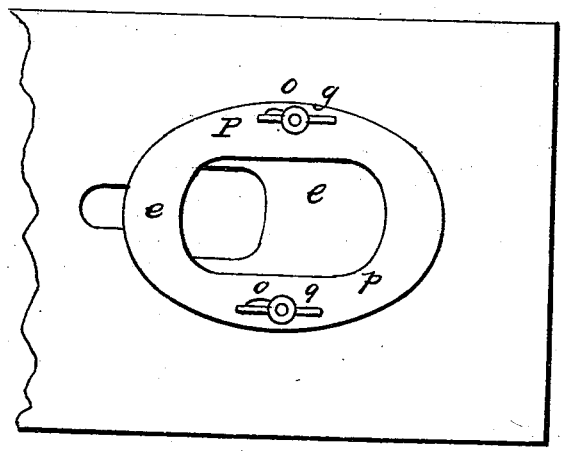
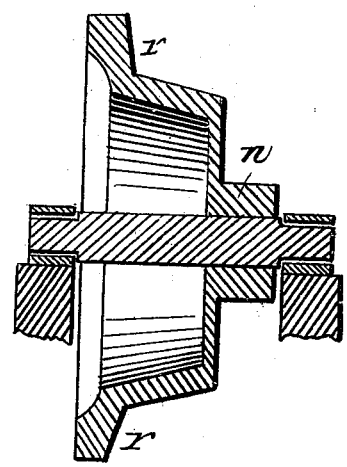

UNITED STATES PATENT OFFICE.

J. M. C. ARMSBY, OF WORCESTER, MASSACHUSETTS.

CORN-SHELLER.

Specification of Letters Patent No. 7,881, dated January 7, 1851.

*To all whom it may concern:*

Be it known that I, JOSHUA M. C. ARMSBY, of Worcester, in the county of Worcester and State of Massachusetts, have invented certain new and useful Improvements in the Construction of Corn-Shellers, and that the following description, taken in connection with the accompanying drawings, hereinafter referred to, forms a full and exact specification of the same, wherein I have set forth the nature and principles of my said improvements by which my invention may be distinguished from others of a similar class, together with such parts as I claim and desire to have secured to me by Letters Patent.

The figures of the accompanying plate of drawings represent my improvements.

Figure 1 is a side elevation of my improved corn sheller, with one of the side slides $a\ a$ removed. Fig. 2 is a plan of the same with the top plate $b\ b$ and its appendages removed. Fig. 3 is a detail plan of said top plate, &c., and Fig. 4 is a detail vertical section taken in the plane of the line A B Fig. 2.

The essential features of the corn sheller which I have improved, are a feeding wheel, $c\ c$, with long bevel teeth, $d\ d$ &c, Figs. 1 and 2; a conducting throat $e\ e$ having a toothed gage and compressing spring $f\ f$, which is susceptible of some regulation and adjustment through the medium of the spring $g\ g$ and thumb screw $h$, operating as will be readily understood by inspection of the drawing; also a driving wheel $i\ i$ with the shelling teeth $k\ k\ k$ &c., on its inner face and a discharging throat $l$, for conveying the cob out after the corn is removed. The driving wheel has a winch $m$ on one end and teeth on its periphery which engage with the teeth of the pinion $n$, cast solid with the feeding wheel $c\ c$. The machine as I have thus far described, is substantially like those in common use, but the fly wheel, in the existing machines, has been placed on the exterior of the casing of the sheller, on one journal of the feeding wheel, and the throat for conducting the ear into the apparatus, has been stationary, and the springing of the gage has been relied upon for the difference in size of the ears. But there is so great a diversity in the diameter of the ears, that this provision for adjustment, is not sufficient. I have therefore made the machine applicable to ears of all possible sizes, by making the throat $e\ e$ adjustable, which I effect by forming slots $o\ o$ in the flange $p\ p$ of said throat, so that said throat may slide forward and back, and be confined in any desired position by the nuts and screws at $q, q$ Fig. 3, operating as will be well understood. The placing the fly wheel as before described, is also objectionable and more expensive than my improved arrangement, which consists in casting it solid with the feeding wheel $c\ c$, as shown at $r\ r$ (Fig. 4) on the opposite side to that on which the pinion $n$ is cast. This is a much cheaper arrangement and places the fly wheel between the two boxes of the feeding wheel, whereby it is much less liable to become disarranged.

Having thus described my improvements. I shall state my claims as follows.

What I claim as my invention and desire to have secured to me by Letters Patent, is—

Casting the fly wheel of the corn sheller solid with the feeding wheel so as to bring it between the two bearings of said wheel as herein before set forth.

JOSHUA M. C. ARMSBY.

Witnesses:
WM. GREENLEAF,
JOSEPH G. WARREN.